United States Patent [19]  [11] 3,873,564
Schneider et al.  [45] Mar. 25, 1975

[54] 2-IMIDAZOLINYL-3-OXIDE-1-OXYPROPIONIC ACID

[75] Inventors: Richard S. Schneider, Sunnyvale; Edwin F. Ullman, Atherton, both of Calif.

[73] Assignee: Synvar Associates, Palo Alto, Calif.

[22] Filed: Sept. 7, 1972

[21] Appl. No.: 287,168

Related U.S. Application Data

[62] Division of Ser. No. 120,726, March 3, 1971, Pat. No. 3,749,644.

[52] U.S. Cl. ...... 260/309.6, 23/230 B, 195/103.5 R, 260/112.5, 260/250 A, 260/256.4 C, 260/257, 260/287 R, 260/288 R, 260/293.63, 260/293.7, 260/295 R, 260/296 R
[51] Int. Cl. ............................................ C07d 49/34
[58] Field of Search ................................ 260/309.6

[56] References Cited
UNITED STATES PATENTS
3,706,537   12/1972   Becher et al. .................... 260/309.6

OTHER PUBLICATIONS
Kreilick et al., J. Amer. Chem. Soc., Vol. 91, pages 5121–5124, (1969), Q1.A5.

*Primary Examiner*—Natalie Trousof

[57] ABSTRACT

Compounds and method for assaying enzymes by adding to a medium containing an enzyme a stable free radical compound having a stable free radical functionality, bonded directly or indirectly to an enzyme labile functionality, which when subjected to an enzyme catalyzed reaction changes the environment of the free radical functionality. By following the change in the electron spin resonance (ESR) spectrum as affected by the change in environment, the type of enzyme and activity of enzyme may be determined.

The compounds which find use in this invention are normally stable nitroxide radicals. Particularly, nitronyl nitroxides, with the nitrogens in an imidazoline ring are employed, having a methylene group joining the 2 position of the imidazoline ring with an asymmetric carbon atom. One of the groups bonded to the asymmetric carbon atoms has an enzyme labile functionality. Other compounds include two cyclic nitroxide containing rings joined by a chain having an enzyme labile functionality.

3 Claims, No Drawings

2-IMIDAZOLINYL-3-OXIDE-1-OXYPROPIONIC ACID

CROSS REFERENCE TO RELATED APPLICATIONS

This is a division of application Ser. No 120,726, filed Mar. 3, 1971, now U.S. Pat. No. 3,749,644.

BACKGROUND OF THE INVENTION

1. Field of the Invention

The assay of the activity of a particular enzyme in an enzyme containing medium is a difficult, time consuming task. Normally, indirect methods aree employed to determine the activity of the enzyme present. One method is to follow the rate at which a substrate for the enzyme is converted to a product. These methods generally employ optical spectroscopic techniques for detecting the conversion of the enzyme substrate to its product. The chemical reaction is designed in such a way that the product formed induces a second reaction which either gives rise to, or destroys, a chromophoric substance. Alternatively, the substrate or product is itself chromophoric and the change in the substrate or product concentration can be directly observed through ultraviolet or visible spectroscopy.

Quite obviously, the spectroscopic methods, depending on the transmission of light, have many shortcomings. One is limited to reactions where a chromophore is involved. Furthermore, the constituents of the enzyme containing medium, such as cell debris, must not interfere with the light absorption of the chromophoric group. In addition, the solution may not be opaque to the light absorbed by the chromophore.

2. Description of the Prior Art

Numerous patents have issued describing the use of stable free radicals for bonding to biologically active substances for structure determination. See for example U.S. Pat. Nos. 3,453,288 and 3,489,522. In addition, a number of texts describe various methods of assaying enzymes. See for example, Richterich, Clinical Chemistry, Academic Press, 1969, and Barman, Enzyme Handbook, Volumes 1 and 2, Springer Verlag, 1969. See also, application Ser. No. 696,718 filed Jan. 10, 1968, now abandoned, and co-pending application Ser. No. 794,008, filed Jan. 27, 1969 now abandoned.

SUMMARY OF THE INVENTION

Compounds and method for assaying enzymer are provided, by preparing compounds having a stable free radical functionality bonded to a functionality subject to chemical conversion, such as hydrolysis, by enzymatic catalysis, so that the reactant and product have different electron spin resonance spectra. The nature of the enzyme and its catalytic activity may be determined; the former, by varying the functionality, and, the latter, by following the rate of conversion of the functionality susceptible to enzyme catalysis.

DETAILED DESCRIPTION

In its broadest form, the subject invention provides a method for assaying enzymes by bonding a stable free radical to a functionality subject to chemical conversion by enzyme catalysis, whereby the environment of the stable free radical changes in going from the reactant to the product, so as to provide a change in the electron spin resonance spectrum. The activity may be determined by following the rate of change and comparing the rate to known standards.

Various types of physical and chemical expedients can be employed so as to change the environment of the stable free radical to result in a change in the electron spin resonance spectrum:

One way is to have a center, which undergoes a change in the degree of asymmetry by virtue of enzymatic conversion, bonded through a methylenic group to a stable free radical containing functionality.

A second way is to have a group bonded to a biradical, whereby the spacial proximity of the two unpaired electrons is modified due to the enzymatic conversion.

A third technique is to bond the stable free radical to a large molecule, a molecule having a molecular weight in excess of about 1,500, preferably in excess of about 5,000, which is subject to enzymatic modification to enhance the mobility of the free radical and follow the change in the electron spin resonance spectrum resulting from the change in motion as the structure of the large molecule is modified.

Other ways can also be employed by devising molecular structures having functionalities subject to enzyme catalyzed chemical conversion, with the conversion causing a change in the ESR spectrum.

Asymmetric Center

The first method of enzyme assay to be considered will be that method which employs an asymmetric center. (By asymmetric center is intended a central atom which changes its degree of asymmetry, either by becoming an asymmetric center, by losing its asymmetry or by changing the nature of the groups around the center.) The molecule will have a stable free radical bonded through a methylene group to an asymmetric center. The groups around the asymmetric center will have at least one group subject to chemical conversion, normally hydrolysis, by direct or indirect enzymatic catalysis, so that the degree of asymmetry changes around the asymmetric center.

The molecules which find use will for the most part have the following formula:

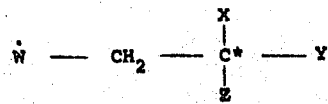

wherein $\dot{W}$ is a stable free radical, preferably a nitroxide radical containing group, and X, Y and Z are at least two different groups, at least one of which is limited to those groups which will be recognizable by the enzyme. That is, the choice of the groups around the carbon atom is such that the enzyme will catalyze, either directly or indirectly, the conversion of the enzyme labile functionality — the groups do not interfere with the desired reaction.

There has been extensive investigation on the types of modifications to known enzyme substrates, which still permit the enzyme to catalyze a reaction with the modified substrate. For example, see Boyer et al, The Enzymes, particularly Volumes 4, 5 and 7, as well as the references cited supra. Based on the knowledge in the art, numerous groups may be used to provide the group -CXYZ bonded to the methylene group which will be subject to chemical conversion by enzyme catalysis. Normally, only one of the groups will have a functionality which is subject to conversion by the enzyme.

It is further found that enzymes vary greatly as to their specificity. Some enzymes merely require the presence of the desired functionality, there being almost no selectivity as to the other groups bonded to the functionality. Phosphatase is relatively non-selective, merely requiring the presence of a phosphate monoester. Trypsin and pepsin, both proteases, are also relatively non-selective in the cleavage of amide bonds. On the other hand, leucine aminopeptidase is extremely selective in requiring leucine as a terminal group, while there may be great variation as to the amine to which the leucyl group is bonded.

There is, therefore, no rational limitation as to the groups X, Y and Z, which may be used in assaying for the presence of enzymes. Depending on the enzyme involved, the molecule will have to have the necessary functionality. However, the other two groups bonded to the asymmetric center may be varied widely, depending on the conformation requirements of the enzyme, the ease of synthesis, the availability of reactants and intermediates, or the magnitude of the change in the electron spin resonance spectrum. Finally, the end product must have the physical and chemical properties necessary for the enzyme assay e.g. solubility, chemical stability, other than the required reactants of the enzyme labile functionality, etc. under the conditions of use.

Normally, the compounds employed will not have more than about 100 carbon atoms, and more usually not more than about 60 carbon atoms. This, however, is a matter of convenience and not necessity. Furthermore, the compounds will normally be soluble in aqueous solvents, at least to a minor degree (greater than $1 \times 10^{-6}$M), and will be free of functionalities which would serve to denature or inactivate the enzyme protein. Therefore, while these is some limitation as to the groups which may be present in X, Y and Z, these limitations are well within the skill of the art to satisfy, and do not require extensive exemplification. For example, acyl halides, mercury halides, groups which are active alkylating agents, such as alkyl sulfates, etc. will normally not be present.

Of the three groups, X, Y and Z, which are bonded to the central carbon atom, usually only one will involve an enzyme labile functionality, when the groups are not involved in being taken together to form a ring. The two groups not directly involved in the enzyme catalyzed reaction will be different and may be hydrogen, halogen, hydrocarbon or substitued hydrocarbon, having from 1 to 3 heteroatoms, such as oxygen, sulfur, halogen or nitrogen, or organic functionalities composed solely of heteroatoms. These groups will be present as hydrocarbyloxy, hydrocarbylthiooxy, hydroxyl, amino, amido, hydrocarbyloxy carbonyl, etc. (Hydrocarbyl is a monovalent organic radical composed solely of carbon and hydrogen). In addition, two or more of the groups bonded to the central carbon atom may be taken together to form mono- or bicyclic rings, whereby the degree of asymmetry changes with the enzyme catalyzed chemical conversion.

Preferred compounds employed in this invention will for the most part have the following formula:

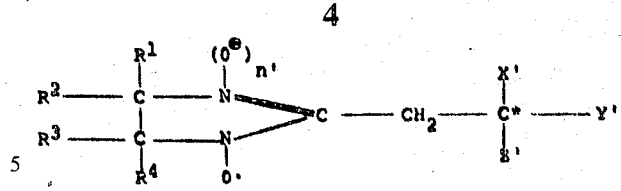

wherein $R^{1-4}$ are organic groups, preferably hydrocarbon groups bonded through carbon to the carbon atoms of the imidazolidine ring, which individually have from 1 to 20 carbon atoms, preferably from 1 to 12 carbon atoms, and particularly preferred, have from 1 to 3 carbon atoms. $R_1^{-}{}_4$ may be aliphatically saturated or unsaturated, preferably having not more than one site of aliphatic unsaturation, i.e. ethylenic or acetylenic.

$R^1$ and $R^2$ or $R^3$ and $R^4$ may be taken together to form rings of from 5 to 7 members which are spiro to the imidazolidine ring. Or, $R^2$ and $R^3$ can be taken together to form a ring of from 5 to 7 annular members with the carbon atoms to which they are attached, which is fused to the imidazolidine ring. The primary purpose of the groups $R^{1-5}$ is to prevent the presence of a hydrogen atom alpha to the nitroxide at the 4 and 5 positions. The hydrogen reduces the stability of the nitroxide free radical. Therefore, any group, either hydrocarbon or substituted hydrocarbon may be used, although lower alkyl, particularly methyl, are the most convenient groups.

$n'$ is an integer of from 0 to 1, wherein when $n'$ is 1, the nitrogen to which 0 is bonded is positively charged.

X' and Y' are groups which may be hydrogen, organic (containing carbon) or heterogroups (containing no carbon) or halogen, X' and Y' being different. X' and Y' may be taken together to form a ring with a carbon atom to which they are attached. The primary function of X' and Y' are to provide the asymmetry around the asymmetric carbon and not to interfere with the enzyme catalysis of the functionality on Z'. Normally, when X' and Y' are organic groups, they will individually not have more than 30 carbon atoms, usually not more than 20 carbon atoms, and will have from 0 to 4 heteroatoms, halogen, oxygen, sulfur or nitrogen. The heterogroups will normally have from 1 to 5, more usually 1 to 3 heteroatoms, such as those listed for the organic group. These limitations are primarily practical and do not go to the nature of the invention. Usually, there will be only one heteroatom bonded to the central carbon atom.

Z' will have the functionality which is subject to the chemical conversion by enzyme catalysis and may be the same or different than Y'. Z' will usually be of up to 30 carbon atoms, more usually of up to 20 carbon atoms. Depending on the particular enzyme to be assayed, a large variety of functional groups may be present being bonded through carbon or the appropriate heteroatom to the asymmetric center. The different kinds of enzymes will be discussed subsequently and the types of functionalities will then be listed.

The preferred groups, X' and Y', around the asymmetric center will have, as one group, hydrogen, alkyl of from 1 to 6 carbon atoms, cyano or a heterogroup of from 1 to 3 heteroatoms. As the second groupp, the substituent will be different from the first group and may be hydrocarbon, aliphatic, alicyclic or aromatic of from 1 to 12 carbon atoms, heterocyclic of from 1 to 12 carbon atoms, having from 1 to 3 heteroatoms, usually nitrogen, oxygen or sulfur, or substituted hydrocarbon of from 1 to 12 carbon atoms and from 1 to 3 heteroatoms, usually oxygen, sulfur or nitrogen, as hydroxyl, carboxyl ($-CO_2-$ or $-O_2C-$) ether (oxy), amino, cyano, the thioanalogs, etc. or a heterogroup such as halo, hydroxy, nitro, inorganic acids and esters, e.g. phosphinate, sulfonate, phosphate, sulfate; amino, etc. Usually, there will be only one heteroatom bonded to the asymmetric center.

The third group will have the enzyme active functionality and will be varied widely depending on the particular enzyme being studied. Normally, the functionality will be directly bonded to the asymmetric center or bonded to an organic group, usually a hydrocarbon group, of from 1 to 12 carbon atoms, and from 0 to 6 heteroatoms, which is bonded to the asymmetric center. Preferably, the hydrocarbon group will be of from 1 to 7 carbon atoms.

Illustrative of groups for X, Y, X' and Y' are hydrogen, halo; such as fluoro, chloro, bromo and iodo; cyano; alkyl, such as methyl, ethyl, isopropyl, hexyl; unsaturated alkyl, such as allyl, 2-butenyl, propynyl, butynyl; alicyclic, such as cyclobutyl, cyclopentyl, bicycloheptyl; aryl and aralkyl, such as phenyl, tolyl, benzyl, naphthyl, chlorophenyl, nitrophenyl, hydroxyphenyl, phenethyl, phenacyl, methylthiophenyl; substituted aliphatic hydrocarbon, such as, methoxyethyl, hydroxypropyl, chloroethyl, trifluoromethyl, cyanobutyl, acetyl, ethoxycarboxylmethyl, nitropropyl, aminocarboxyethyl, N,N-dimethylaminohexyl, 2-chloropropanol; and heterocyclic, such as piperidyl, N-methylpiperidyl, pyrrolidinyl, furyl, thienyl, tetrahydrofuranyl, dioxanyl, diazolyl, pyridazinyl, nicotinyl, indolinyl, quinolinyl, isoxazolyl, and thiacyclohexyl. X and Y may be taken together to form a ring which does not have a plane of symmetry perpendicular to the ring and passing through the central carbon atom. Any of the rings indicated above fulfilling the above requirement may be present. Among compounds of interest are compounds of the formula

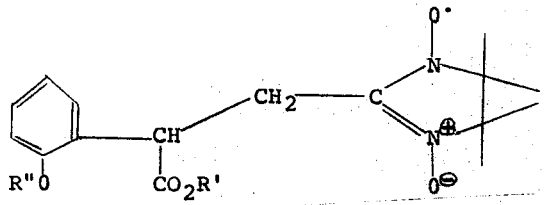

wherein R' is hydrocarbon of from 1 to 12 carbon atoms or $Cl(CH_3)_3NCH_2CH_2-$ and R'' is H, phosphate alkali metal salt, or hydrocarbon of from 1 to 12 carbon atoms, and

is tetramethylethylenyl. Of particular interest is where R' is lower alkyl and R'' is phosphate alkali metal salt.

Biradical

The biradical is based on having two stable free radical groups in the same molecule, either the same or different, within about 25 Angstroms of each other, preferably within about 18 Angstroms on a time average basis. Attached to the molecule is at least one group, which is subject to chemical conversion by enzymatic catalysis. The functionality subject to the chemical conversion may be one joining the two free radical groups, may be bonded to the chain which joins the two free radical, or may be bonded to one of the radicals.

The ability to measure the catalytic activity of the enzyme is based on the variation in the ESR spectra. When there are two free radical groups in the same molecule, and the electrons are close together, the spectrum will appear as though the unpaired electrons, associated with each group, are spending half of their time on each of the monoradical moieties. When the free radical groups are far apart, or unfavorably oriented relative to each other, each electron appears to be associated with only one monoradical. If the two unpaired electrons are at intermediate distances, a complex intermediate spectrum is obtained which is highly sensitive to small changes in the structure of the molecule. By employing molecules, which upon conversion of the substrate portion of the molecule to its enzymatic product, causes a change in the average distance between the two unpaired electrons, the rate of change from substrate to product can be monitored.

The compounds employed for enzyme assay by varying the distance between two free radical groups will have the following formula:

wherein the $\dot{W}^1$'s are stable free radicals, which may be the same or different, preferably nitroxide radicals, and A is an organic group which has a functionality subject to chemical conversion by enzymatic catalysis, for example, hydrolytic conversion, which upon undergoing the enzymatic catalyzed reaction changes the spatial relationship of the two free radical groups.

The radicals employed for $\dot{W}^1$ can be varied widely. Typical nitroxide radicals which may be employed include di-tert.-alkyl nitroxides, where A is bonded to the nitrogen of the nitroxide by a carbon atom bonded solely to carbon atoms; a heterocyclic nitroxide of from 5 to 6 annular members, where the nitrogen of the nitroxide is an annular member, by imidazolidine nitroxides, which were illustrated previously in discussing the compounds having an asymmetric center; by oxazolidine-3-oxyl and thiazolidine-3-oxyl nitroxides (see copending application Ser. No 29,662, filed Apr. 17, 1970, now U.S. Pat. No. 3,673,207); by diarylnitroxides, where the aryl group has a substituent which may be bonded to A; by porphyrexide, as well as many other nitroxides known in the art. See Forrester et al., Organic Chemistry of Stable Free Radicals, Academic Press, 1968, Chapter 5, entitled, "Nitroxides".

Any organic nitroxide may be employed which may be bonded to a group having a functionality subject to chemical conversion by enzymatic catalysis. $\dot{W}^1$ will normally not be more than 60 carbon atoms, preferably not more than 30 carbon atoms, and particularly preferred not more than about 12 carbon atoms. The group designated as A will vary widely, depending upon the particular substrate and the method of bonding to $\dot{W}^1$, usually being not more than 60 carbon atoms, preferably not more than 30 carbon atoms, and particularly preferred not more than 20 carbon atoms. Of course, A will have a variety of heteroatoms depending on the particular method of bonding to the group designated as $\dot{W}^1$ and the particular functionality to be subjected to conversion by enzymatic catalysis. Preferably, A will be free of heteroatoms except those involved in the linking groups to the free radical functionality and those involved in the enzyme labile group.

The functionalities having heteroatoms involved in linking or as the enzyme labile groups are illustrated by esters, amides, phosphates, ethers (oxy and thiooxyl, amines, keto and sulfone.

A special biradical is used with glutamate pyruvate transaminase and has the formula:

wherein $\dot{W}^1$ is defined previously and p is an integer of from 2 to 3. Preferably, $\dot{W}^1$ will be a heterocyclic ring of from 5 to 6 annular members, having from one to two heteromembers, nitrogen or oxygen, 0 to 1 site of ethylenic unsaturation and the nitrogen of the nitroide as a heteroannular member is bonded solely to carbon atoms, which are disubstituted with hydrocarbon groups or one of the two carbon atoms is doubly bonded. The particular free radical groups will be discussed subsequently.

Mobilization

The enzymatic assay employing the mobilization method will use as a substrate a single, preferably, plurality of free radical groups bonded to a substrate of high molecular weight, molecular weight far in excess of the radical containing group. Normally, the high molecular weight compound will have at least about 1,500 molecular weight, more usually about 5,000 molecular weight and could be as high as 5 million or higher. There is no limit to the maximum molecular weight, as long as it can be introduced into a medium in which the enzyme is active.

The compositions which will find use in this method of determination will have the following formula:

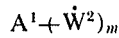

wherein $\dot{W}^2$ is a stable free radical, preferably a nitroxide radical, having the same limitations designated for $\dot{W}^1$, each bonded directly to $A^1$, and m is a number, usually in the range of about 1 to 1,000, more usually in the range of 2 to 100. $A^1$ is a polymer of at least 1,500 molecular weight, preferably at least 5,000 molecular weight and particularly preferred of at least 10,000 molecular weight having a functionality subject to cleavage by enzymatic catalysis which results in a loosening of the polymeric structure, so as to enhance the mobility of the stable free radical with a resulting change in the electron spin resonance spectrum. The functionality may be the joining functionality such as a carboxamide or ether group. Alternatively, it may be a cross-linking unit, such as a dithio group. $A^1$ may be naturally occurring or synthetic and may include such compositions as polysaccharides, e.g., starch and pectins; polypeptides, e.g., proteins; nucleic acids; polyamides; polyesters; etc.

The ability to detect the modification of the polymer is derived from the fact that as long as the free radical functionality is tightly bound to a large rigid molecule, it will tumble slowly in solution and give a spectrum which s characteristic of an immobilized spin. However, as the polymer is modified and the structure loosened, e.g. breaking of cross-linking units, the free radical functionality becomes freer to rotate and the spectrum changes to one more characteristic of freely rotating spins. By observing the change in spectrum, one can determine the catalytic activity of the enzyme.

The free radical may be bonded by any convenient functionality depending on the reactive groups present in the polymer. With alcohols, ethers, esters, urethanes, etc., may be used as the bonding link. With amines, amides, ureas, xanthates, etc. may serve as a bonding link. The particular method of linking will normally not be important, as long as the linking unit is stable under the conditions being employed for the enzymatic assay.

Free Radical Group

While any convenient stable free radical may be employed in the biradical and mobilization assay methods, the preferred free radical functionality is the nitroxide functionality, particularly where it is involved in a heterocyclic ring. These free radicals will have the formula:

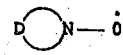

wherein D is of 5 to 40 carbon atoms, more usually 5 to 22 carbon atoms, and from 0 to 6 heteroatoms, oxygen or nitrogen, there being a total of from 5 to 7 annular members. D may have from 0 to 2 sites of ethylenic unsaturation, or aromatic unsaturation, and will usually have from 0 to 1 heteroannular member. Included in D is a linking functionality, so that the nitroxide group may be bonded to the enzyme labile functionality. The linking group can be an amine, carboxylic acid, alcohol, isocyanate, nitrile, etc., or the direct bond.

The usual heterocyclic nitroxide compounds will have from 5 to 6 annular members and be either tetrasubstituted to carbon about the nitroxide functionality, e.g. hydrocarbyl groups, or be disubstituted at one position and have a double bond to the carbon atom at the other position. The preferred rings are diazoles, piperidine, pyrroline, pyrrolidine, thiazolidine, and oxazolidine.

Illustrative free radicals include those already described having a 1-oxylimidazolidinylmethylene group bonded to a center of asymmetry, 1-oxyl-2,2,5,5-tetraalkyl pyrrolidine, 1-oxyl-2,2,5,5-tetraalkyl pyrroline, 1-oxyl-2,2,6,6-tetraalkyl piperidine, 3-oxyl-4,4-dialkyloxazolidine and, 1,1-dioxy-3-oxyl-4,4-dialkylthiazolidine.

The preferred nitroxide compounds are those having 5 to 6 annular members, from 1 to 2 nitrogen annular members, and 0 to 1 chalcogen (oxygen or sulfur) annular member, di- or tetra-hydrocarbonsubstituted, hydrocarbon groups of from 1 to 12 carbon atoms, preferably of from 1 to 8 carbon atoms, usually alkyl, bonded directly or indirectly to the enzyme labile functionality. If di-hydrocarbon substituted, the other carbon atom is doubly bonded to another atom, e.g. carbon and nitrogen.

ENZYMES

A wide variety of enzymes may be assayed by employing different functionalities in association with the stable free radical. For the most part, hydrolytic enzymes will be involved. Therefore, the reactions to which the subject invention are primarily concerned involve the addition of or the removal of a molecule of water during the course of the reaction. However, many other enzymes may be assayed other than the hydrolytic enzymes.

The hydrolytic reactions will be primarily concerned with hydrolysis of ethers, e.g. as in acetals in sugar, hydrolysis of amides, e.g. as in proteins, hydrolysis of esters, as in lipids and phosphates, hydration of olefins, or the corresponding reverse reactions. Other reactions include reduction of a ketone to an amine group, decarboxylation, dehydrogenation, isomerization, etc. Various groups of enzymes include hydrolases, e.g. carbohydrases; nucleases, amidases, e.g. transaminases, peptidases, proteinases; esterases, hydrases, phosphatases, isomerases, dehydrogenases, etc.

Furthermore, while the discussion has been centered on cleavage of a bond by hydrolysis, catalyzed by an enzyme, substrates could be employed where bonds were made, so that a synthesis occurred resulting in a change in the ESR spectrum. For example, an amine bonded to a stable free radical might be used in the enzyme catalyzed formation of an amide with an amino acid. This change would result in a change in the ESR spectrum, which could be followed by ESR spectroscopy.

The following is a list of various reactions within the subject invention which may be carried out employing enzyme catalysis. They, therefore, include the more common functionalities which are bonded to the free radical for the enzyme assay.

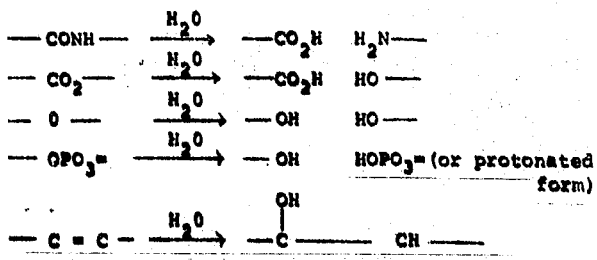

These functionalities include ethers; esters, both organic and inorganic, e.g., carboxylates and phosphates; amides, usually carboxamide and hydration or dehydration of olefins.

The carboxamide labile group will be primarily concerned with peptides, that is, at least one amino acid group involved in a carboxamide link. Various amino acids may be used, such as glycine, arginine, leucine, aspartic acid, methionine, cysteine, threonine, alanine, valine, histidine, tyrosine, etc. The amino acid may be bonded to a different amino acid or to a carboxyl or amino group which is not part of an amino acid. This will depend on the particular enzyme being assayed as well as the ease of synthesis of the free radical labeled compound.

Other reactions involving common functionalities may be indicated as follows:

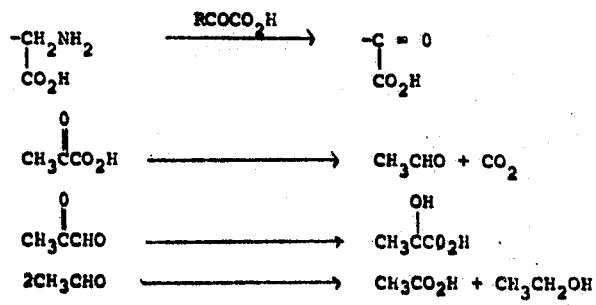

These functionalities include ketones, aldehydes, alcohols, amines and carboxylic acids.

Indirect sensing of enzymatic activity is provided by having the free radical functionality react with the substrate. For example, the enzyme glutamate pyruvate transaminase may be assayed with bis-1,2[4'-(1-oxyl-2',2',6',6'-piperidinyl)amino]-ethane, where the diamine reacts with α-ketoglutaric acid but not with the pyruvic acid, to provide a detectable change in ESR spectrum.

Thus, there is a broad spectrum of enzymes which may be assayed accurately and easily by using electron spin resonance spectroscopy. The following examples will serve to illustrate a variety of different compounds which were prepared and employed for enzyme assay, using known commercially available enzymes as standards.

(All temperatures are reported in Centrigrade)

EXAMPLE 1

3-(4,4,5,5-tetramethyl-2-imidazolinyl-3-oxide-1-oxyl)-2-(2-pyridyl)-1-propyl phosphate A. Into a reaction flask containing 10 g. of 2-pyridyl acetate (60.6 mmole) in 100 ml. of dimethyl formamide at 0°C. was added 1.46 g. of sodium hydride (60.6 mmole). After stirring the mixture under nitrogen for 10 minutes, the mixture was warmed to 25°C. and stirred for 30 minutes, then recooled to 0°C. To the mixture was then added dropwise 18.0 g. of bromoacetaldehyde diethyl acetal (91.2 mmole) in 20 ml. dimethylformamide and the mixture stirred while being warmed in a 70°C. bath for 5 hours, followed by standing over night at ambient temperatures. The reaction mixture was then poured into water, washed 3 times with ether, the ether solutions combined and washed once with aqueous sodium chloride followed by drying, evaporation of the ether and distillation to give 8.5 g. of product (b.p. 125°–135°C./0.1 mm. hg.). Mass spectral analysis, as well as the infrared spectrum and nuclear magnetic resonance spectrum were consistent with the desired product, ethyl gamma, gamma-diethoxy-alpha-(2-pyridyl) butyrate.

B. To a solution of sodium dimethoxyethoxy alumimum hydride (0.635 ml. of 70 weight percent solution in benzene) under nitrogen was added 0.344 g. of the above ester (1.22 mmole) and 3 ml. benzene. After stirring for 24 hours at ambient temperatures, water was cautiously added to destroy the excess reducing agent. The organic phase was then dryed over magnesium sulfate, filtered and evaporated to yield 0.342 g. of crude product. The alcohol product was purified by preparative thin layer chromatography (TLC) on silica with 10 percent methanol:ether as eluent. The product distilled at 130°c./0.1 mm. Hg. The infrared and NMR spectra were consistent with the product as 4,4-diethoxy-2-(2-pyridyl)-1-butanol.

C. Into a reaction vessel was introduced 0.74 g. of the above acetal (3.12 mmole) and 9.0 ml. of 0.69 M cyanoethyl phosphate (6.23 mmole) and the mixture dehydrated by 3 evaporations with anhydrous pyridine. To the mixture was then added 20 ml. dry pyridine and 3.84 g. of dicyclohexylcarbodiimide (18.6 mmole). After stoppering the mixture and stirring at ambient temperatures for 2 days, 1 ml. water was added, followed an hour later by an additional 10 ml. of water.

The insoluble urea which formed was removed by filtration. The filtrate was evaporated, keeping the temperature below 35°C. and a solution of lithium hydroxide (50 ml., 0.5 M) was added and the mixture refluxed under nitrogen for 40 minutes.

After cooling the mixture to 25°C., it was acidified to pH 3 with hydrochloric acid. After refluxing for 30 minutes followed by evaporation to dryness, the residue was dissolved in a mixture of 10 ml. of water and 40 ml. of methanol and the pH adjusted to neutral with dilute base. To the solution was then added, 2,3-dimethyl-2,3-bis(hydroxylamino)butane (0.5 g.) and the solution stirred at 25°C. for two hours. After evaporation of the solvent, the residue was dissolved in saturated aqueous sodium bicarbonate and aqueous sodium periodate cautiously added. After each addition of a few drops of the oxidant, the mixture was vigorously shaken. The addition of oxidant was continued until no further increase in radical coloration could be detected by visual observation. The red aqueous solution was washed twice with chloroform, followed by freeze drying to a light purple powder which was triturated with methanol, then filtered. The methanol was evaporated to give 500 mg. of a dark purple solid.

The product had the following ESR spectrum:
pH 3: $a_N = 8.0$, $a_{H_1} = 2.75$, $a_{H_2} = 1.7$ gauss;
pH 9: $a_N = 8.0$, $a_{H_1} = 3.3$, $a_{H_2} = 0.7$ gauss.

D. The alcohol free radical product derived from hydrolysis of the phosphate ester may be prepared directly as follows:

Into a reaction vessel was introduced 0.10 g. of the above acetal, 2 ml. ethanol and 10 ml. 0.1N hydrochloric acid. The mixture was refluxed for 1 hour, diluted with water, and extracted with chloroform. The aqueous phase was then adjusted to pH 9 by the addition of base and the crude aldehyde extracted into chloroform. The organic solvent was removed, the residue dissolved in 5 ml. methanol, and 100 mg. 2,3-dimethyl-2,3-bis(hydroxylamino) butane was added. After 5 hours at room temperature, the radical was prepared by sodium periodate oxidation of the diazole as described above. The volatile materials were evaporated and the crude product purified with preparative thin layer chromatography on silica using 10:1 ether:methanol as eluent. The major product (r.f.=0.4) was 3-(4,4,5,5-tetramethyl-2-imidazolinyl-3-oxide-1-oxyl)-2-(2-pyridyl)-1-propanol.

The product had the following ESR spectrum:
(pH 6.39): $a_N = 8.07$, $a_{A_1} = 2.89$, $a_{H_2} = 1.25$ gauss.

EXAMPLE 2

2-(2-pyridyl)-1-(4,4,5,5-tetramethyl-2-imidazolinyl-3-oxide-1-oxyl)-3-pentyl phosphate A. To a solution of 2.31 g. of 1,1-diethoxy-3-(2-pyridyl)propane (11.0 mmole) (prepared according to G. Jones et al, J. Chem. Soc. 1958, 3631) in 90 ml. of dry tetrahydrofuran cooled under nitrogen to −65°C. was added a 1.6 M. solution in hexane of n-butyl lithium (13.3 mmole) and the reaction stirred at −65°C. for 10 minutes, warmed to 0°C. and maintained at that temperature for 30 minutes. To the mixture was then added dropwise 0.775 g. of propionaldehyde (13.3 mmole) in 10 ml. tetrahydrofuran, while the color changed from red to light yellow. After 1 hour at 0°C., the reaction mixture was poured into an aqueous ammonium chloride solution and washed three times with ether. The product was distilled at 140°–152°C. at 0.5 mm. Hg.

The procedure for hydrolyzing the acetal, preparing the diazole and oxidizing the diazole to the imidazolinyl-3-oxide-1-oxyl followed the method of example 1.

The resulting alcohol was then transformed to the phosphate in the same manner as described in example 1.

The product was purified by freeze drying the aqueous solution, trituration of the residue with methanol and chromatographing of the methanol soluble portion with methanol as eluent. The product could not be satisfactorily separated completely from inorganic salts.

The product had the following ESR spectrum:
(pH 3.49): $a_N = 8.0$, $a_{H_1} = 3.0$, $a_{H_2} = 1.25$ gauss:
(pH 10.98): $a_N = 8.0$, $a_{H_1} = 3.25$, $a_{H_2} = 0.75$ gauss.

EXAMPLE 3

Methyl α-(o-hydroxyphenyl)-beta-(4,4,5,5-tetramethyl-2-imidazolinyl-3-oxide-1-oxyl)propionate acid phosphate A. To a cold solution of 5.0 g. of methyl o-hydroxyphenylacetate in 100 ml. dry benzene under nitrogen was added 1.09 g. of sodium hydride (45.3 mmole). The solution was stirred at 10°C. for 1 hour, then cooled in an ice bath and 3.62 g. of chloromethyl ether in 10 ml. of benzene added dropwise. After stirring at room temperature for 1 hour, the product was poured into water and washed twice with ether. The combined ether extracts were washed once with sodium bicarbonate, dried and evaporated to give 7.3 g. of product which was distilled to give 6.19 g. of a product boiling at 108°–110°C. at 0.1 mm. Hg.

B. To a cold solution of 10 g. of the above product (49.0 mmole) in 100 ml. of dry dimethyl formamide was added 1.4 g. of sodium hydride (58.6 mmole) and the reaction stirred under nitrogen at 5–10°C. for 10 minutes followed by stirring at ambient temperatures for 1 hour. After cooling the solution in an ice bath, 14.5 g. of bromoacetaldehyde diethyl acetal (73.5 mmole) in 5 ml. of dimethyl formamide was added dropwise over 5 minutes. The mixture was then stirred at 25°C. for 3 hours, poured into water and washed three times with ether. The volatiles were then evaporated and the residue distilled under reduced pressure, the product boiling at 150°–155°C. at 0.1 mm. Hg.

C. A solution of 0.428 g. of the above product, 5 ml. glacial acetic acid and 5 ml. 1 N hydrochloric acid was stirred at 80°C. in an oil bath for 30 minutes. The reaction mixture was then poured into water and washed three times with ether. The volatile materials were evaporated and the crude product purified with preparative thin layer chromatography on silica using 2:1 ether:hexane as eluent. The pure product (0.17 g.) was removed from the silica with ether.

D. Into a reaction flask was introduced 0.17 g. of the above product (0.8 mmole) and 0.10 g. of 2,3-dimethyl-2,3-bis (hydroxylamino) butane (0.8 mmole) in 5 ml. of methanol and the mixture stirred at 25°C. for 18 hours. Volatile materials were then evaporated and the residue dissolved in chloroform, the solution transferred to a separatory funnel and 20 ml. of water and 20 ml. of aqueous saturated sodium bicarbonate solution added followed by cautious addition of aqueous sodium periodate. After each addition of a few drops of oxidant, the reaction mixture was vigorously shaken.

When no further increase in radical coloration could be detected by visual observation, the aqueous solution was then washed three times with chloroform and the combined organic extracts washed once with saturated aqueous ammonium chloride. The product was purified by chromatography on silica with ether as eluent.

E. Into a reaction vessel was introduced 20 ml. of dry triethyl amine and 10 ml. of dry acetone, the mixture cooled to 0°C and 0.080 ml. of phosphorous oxychloride added. To this mixture was then added 0.28 g. of the above product (0.834 mmole) dissolved in a solution of 5 ml. dry triethyl amine and 5 ml. dry acetone at 0°C. and the reaction mixture stirred at 0°C. for 15 minutes. Two additional 0.08 ml. portions of phosphorous oxychloride were added to the cold reaction mixture at 15 minute intervals. Fifteen minutes after the final addition, the solvents were removed in vacuo, while maintaining the temperature at 0°C. A saturated aqueous sodium bicarbonate solution (50 ml.) at a temperature of 0°C was added and this solution stirred at 0°C for 30 minutes. The pH was maintained at 7–8 and solid sodium bicarbonate added as required. After evaporating the reaction mixture to dryness, the residue was triturated with methanol and filtered. The methanol solution was then evaporated to give the desired product.

The product had the following ESR spectrum:
(pH 9.2): $a_N = 8.0$, $a_{H_1}$ 2.3, $a_{H_2} = 2.0$ gauss.

EXAMPLE 4

2-[5'-(1''-methylbutyl)-5'-(1'''33''-dioxy-4''',4''',5''',5'''-tetramethyl-4''',5'''-dihydro-2'''-imidazomethyl)barbituryl]ethyl phosphate A. To 3.13 ml. ($3×10^{-3}$ mol) of 0.96 M. sodium ethoxide in ethanol was added 1.1 g. ($3×10^{-3}$ mol) of 5-(1-methylbutyl)-5-(1,3-dioxy-4,4,5,5-tetramethyl-4,5-dihydro-2-imidazomethyl) barbituric acid (prepared as described in co-pending application Ser. No. 794,008, filed Jan. 27, 1969). After stirring the mixture for 2 hours, the methanol was removed in vacuo and a solution of 0.369 g. of β-chloroethyl acetate in 15 ml. of dry dimethyl formamide was added. After heating the mixture at 48°C. for 48 hours with stirring, the dimethyl formamide was removed in vacuo, leaving a residue which was dissolved in 2 N aqueous sodium hydroxide. After extracting the solution with methylene chloride, the aqueous phase was allowed to stand for 2 hours, acidified with acetic acid to a pH 5 and then extracted again with methylene chloride. The extracts were dried over sodium sulfate and the volatiles removed in vacuo.

The residue was dissolved in benzene and 0.16 g. of pyridine (0.0021 mol) and 0.16 g. of trimethylsilylchloride (0.0015 mol) were added. After stirring the mixture for 2 hours and then removing all volatiles in vacuo, the product was purified by preparative thin layer chromatography. After removing the product from the silica gel with methanol, two drops of acetic acid were added and the solution heated to about 50°C. under nitrogen and maintained at that temperature for 16 hours. The methanol was then removed in vacuo and the product purified by preparative thin layer chromatography (3:1 benzene/acetone) to yield 61 mg. of the desired product.

B. In 20 ml. of dry pyridine to which had been added 3 ml. of a 0.674 M solution of cyanoethyl phosphate ($2×10^{-3}$ mol) in pyridine was added 400 mg. of the above product and the solution taken in dryness in vacuo, while maintaining the temperature below 30°C. To the residue was added 20 ml. of dry pyridine, the solution evaporated and this treatment with pyridine repeated two additional times.

Finally, an additional 20 ml. of dry pyridine was added and 1 g of dicyclohexylcarbodiimide ($4×10^{-3}$ mol). After allowing the solution to stand for 16 hours (care should be taken that the time is not unduly extended), 1 ml. of water was added, the mixture stirred for 2 hours, filtared and volatiles removed. The residue was a gum which was dissolved in buffered water having a pH 4.8 and the aqueous solution extracted with methylene chloride. The aqueous phase was taken to dryness in vacuo, keeping the temperature below 30°C., leaving a gum.

The gum was dissolved in 20 ml. of 0.5 M aqueous lithium hydroxide, the solution heated at 50°C. for 5 hours and then acidified to a pH 6 with acetic acid. After centrifugation to remove insoluble inorganic phosphate, the solution was taken to dryness in vacuo maintaining the temperature below 30°C. to yield a gum which was purified by preparative thin layer chromatography. The product was a hygroscopic solid, which while contaminated with silica gel, was a single compound by thin layer chromatography.

EXAMPLE 5

Leucyl 2-(o-benzyloxyphenyl)-4-(4,4,5,5-tetramethyl-2-imidazolinyl-3-oxide-1-oxyl)-1-butylamine A. A mixture of 8 g. of methyl o-hydroxyphenylacetate (4.82 mmole), 7.9 g. of benzyl chloride (6.25 mmole), 8.0 g. of potassium iodide (4.82 mmole), 26.8 g. of potassium carbonate (19.2 mmole) and 175 ml. acetone was stirred and refluxed for 24 hours. The solids were removed by filtration and the filtrate evaporated to dryness. After dissolving the residue in ether, the ether solution was washed with dilute base followed by saturated aqueous ammonium chloride. Evaporation of the volatiles gave a yellow oil which was vacuum distilled, boiling at 155–162°C. at 0.3 mm. Hg. The light yellow oil crystallized on standing and could be recrystallized from ether-hexane.

B. To a cold solution of 3.03 g. of methyl o-benzyloxyphenylacetate (11.8 mmole) in 50 ml. dry dimethyl formamide under nitrogen was added 0.34 g. of sodium hydride (14.2 mmole), the solution stirred at room temperature for 1 hour, and then recooled at 5°C. To the solution was then added dripwise over 5 minutes a solution of 3.5 g. of bromoacetaldehyde diethyl acetal (17.7 mmole) in 5.0 ml. dimethyl formamide. After stirring the mixture at 25°C. for 3.5 hours, the mixture was poured into water and the water extracted 4 times with ether. The combined ether extracts were evaporated to give a light yellow oil distilling at 190–192°C. at 0.1 mm. Hg.

C. Saponification of 2 g. of the above ester was carried out as described in Example 6. A mixed anhydride was then prepared using ethyl chloroformate as described in Example 6.

D. To a saturated ethereal solution of ammonia was added dropwise 2.05 g. of the above product (4.77 mmole) in ether at 5°C. with vigorous stirring. An excess of ammonia was maintained. After stirring at 5°C. for 30 minutes and at ambient temperatures for an additional 30 minutes, the solution was evaporated to yield a light yellow oil.

E. To a suspension of 0.66 g. of lithium aluminum hydride (17.5 mmole) in 40 ml. tetrahydrofuran under nitrogen at 0°C. was added a solution of 2.11 g. of the above product (5.8 mmole) in 10 ml. tetrahydrofuran. The mixture was stirred for 1 hour at 25°C. and then refluxed for 5 hours. After cooling the mixture to 5°C., the excess hydride was decomposed by the cautious addition of saturated aqueous sodium sulfate. The organic solution was decanted from the inorganic salts, the salts washed several times with ether and the combined ether phases dried and evaporated to yield 1.74 g. of a light yellow oil. Purification was achieved by chromatography on silica with ether as the initial eluent to remove traces of starting material. Elution with 20 percent methanol/ether gave 1.68 g. of the amine product as a light yellow oil.

F. To a solution of 0.403 g. of the above product (1.185 mmole) and 0.242 g. dicyclohexylcarbodiimide (1.185 mmole) in 10 ml. ethyl acetate was added 0.293 Boc-tert-butyloxycarbonyl). The mixture was stirred at 25°C. for 24 hours, filtered and evaporated to give 0.710 g. of colorless oil. Chromatography on silica with 1:1 ether:-hexane gave 0.658 g. (100 percent) of the Boc-leucyl derivative as a viscous oil.

G. A solution of 0.180 g. of the above product in 5 ml. 1 N hydrochloric acid and 5 ml. glacial acetic acid was warmed at 90°C. for 15 minutes. Carbon dioxide evolution was observed and judged to be completed within this time period. The solvents were evaporated to approximately 1 ml. and 10 ml. of methanol was added. The pH was adjusted to 9 with 1 M sodium hydroxide and 100 mg. 2,3-dimethyl-2,3-bis-(hydroxylamino)butane was added. After stirring for 1 hour at 25°C. the methanol was removed and the residue oxidized with aqueous sodium periodate in the normal manner. The chloroform soluble radical was purified by preparative thin layer chromatography with 10% methanol/ether as eluent.

H. The amine product from the leucine amide hydrolysis may be prepared directly as follows:

A solution of 100 mg. 2-(o-benzyloxyphenyl)-4,4-diethoxy-1-butylamine, 10 ml. 0.1 N hydrochloric acid and 2 ml. methanol was stirred at 80°–90°c. for 15 minutes and then evaporated to dryness. The residue was dissolved in 10 ml. methanol and 1.0 N sodium hydroxide was added to provide pH 8. 2,3-Dimethyl-2,3-bis-(hydroxylamino)butane (100 mg.) was then added and after 1 hour at 25°C. the crude diazole was converted to 2-(o-benzyloxyphenyl)-4-(4,4,5,5-tetramethyl-2-imidazolinyl-3-oxide-1-oxyl)-1-butylamine by oxidation with sodium periodate in the manner described in Example 1. The product has the following ESR spectrum.

(pH 4.35) $a_N = 8.12$, $a_{H_1} = 3.21$, $a_{H_2} = 0.9$ gauss,
(pH 7.8) $a_N = 8.10$, $a_{H_1} = 3.15$, $a_{H_2} = 0.8$ gauss,
(pH 12.8) $a_N = 8.20$, $a_{H_1} = 3.0$, $a_{H_2} = 1.12$ gauss.

EXAMPLE 6

α-(o-hydroxyphenyl)-beta-(4,4,5,5-tetramethyl-2-imidazolinyl-3-oxide-1-oxyl)propionic acid choline ester A. A mixture of 0.752 g. (2.31 mmole) of methyl 2-(o-methoxymethoxyphenyl)-4,4-diethoxybutyrate, 0.5 ml. 1 M sodium hydroxide, 4 ml. water and 3 ml. methanol was refluxed for 1.5 hours. The cooled reaction mixture was poured into water and washed three times with chloroform to remove unreacted starting material. In this manner 0.160 g. of starting material (20 percent) was recovered. The aqueous solution was then acidified to pH 3 and rewashed with chloroform giving 0.610 g. (83 percent) of colorless oil.

B. A solution of 0.60 g. of the above product (1.92 mmole) in 1.92 g. triethyl amine (dry) (19.2 mmole) and 20 ml. ether was cooled at 0°C. A solution of ethyl chloroformate (0.210 g., 1.92 mmole) in 2 ml. ether was added dropwise with stirring. The precipitation of triethylamine hydrochloride began almost immediately and the reaction was stirred at 0°C. for 1 hour. After filtering, the solvents were removed under reduced pressure to give 0.70 g. colorless oil (95 percent).

C. The mixed anhydride of the proceeding preparation (0.81 g., 2.1×10$^{-3}$ mol) was dissolved in 5 ml. of dry N,N-dimethylformamide. Choline iodine (2 equivalents) was added and the resultant yellow solution stirred at room temperature for 16 hours.

The dimethyl formamide solution was concentrated to 3 ml. in vacuo (50°C. 1 mm. Hg.) and ether (25 ml.) added. A while solid precipitated which was filtered off. The resultant solution was evaporated to dryness. Acetic acid (10 ml.) and 0.1 N hydrochloric acid (10 ml.) were added and the solution stirred at 85°C. for 20 minutes. The acid was removed in vacuo at 40°C. The residue was dissolved in methanol:water (1:1) and 2,3-dimethyl-2,3-bis-(hydroxylamino)butane was added.

This solution was stirred at room temperature for 3 hours. Most of the methanol was removed in vacuo at room temperature. An additional 60 ml. of water was added and followed by enough aqueous sodium bicarbonate to adjust the pH to 7. Aqueous sodium metaperiodate was added dropwise to a maximum pink color, but so that no excess of periodate existed in the solution. The aqueous solution containing the radical was extracted with chloroform and the aqueous phase freeze dried. The residue was dissolved in chloroform:methanol (1:4) and filtered. The resultant solution was chromatographed (silica, ether:methanol (1.1). The material was removed from the silica gel with methanol and concentrated in vacuo to give the product.

The product had the following EST spectrum:
(pH 6): $a_N = 7.9$, $a_{H_1} = a_{H_2} = 2.0$ gauss.

EXAMPLE 7

2-[2(o-carboxyphenyl)-1-propyl]-4,4,5,5-tetramethyl imidazoline-3-oxide-1-oxyl choline ester A. To a solution of 4-methyl-1-tetralone (10 g., 62 mmole) in 200 ml. of glacial acetic acid was added two equivalents of lead tetraacetate (55.0 g., 124 mmole). The mixture was stirred at 60°C. under nitrogen until the majority of the lead tetraacetate dissolved. Boron trifluoride etherate (8.8 g., 62 mmole) was added and the resultant brown mixture was stirred for a total of 72 hours under nitrogen at room temperature. During this period one additional equivalent of lead tetraacetate (28 g., 62 mmole) was added (when the KI-starch test indicated that the original two equivalents had been used up).

The reaction mixture was cooled to room temperature and poured into 1 l. of water. The aqueous phase was extracted with two 200 ml. portions of ether. Then the aqueous and organic phases were filtered through Celite to remove the lead salts. The aqueous phase was again extracted with five 200 ml. portions of ether. The combined ether solutions were washed successively with two 500 ml. portions of saturated aqueous sodium chloride, dilute aqueous sodium carbonate to pH 7, and two 250 ml. portions of saturated aqueous ammonium chloride. The ether solution was then dried and concentrated in vacuo to give 13.1 g. of crude product (major product on TLC, silica, ether--hexane (1:3)).

This mixture was purified by distillation to give 9.2 g. (68 percent) of pure 2-acetoxy-4-methyl-1-tetralone as a viscous yellow liquid, boiling at 131°–138°C. at 0.075 mm. Hg.

On standing at 0°C. for three days this liquid afforded crystals. An analytical sample was recrystallized from ether--hexane to give white crystals, m.p. 81°C.

B. The above product (1.5 g., 6.9 mmole) was dissolved in 25 ml. of methanol. The solution was degassed with nitrogen, and 25 ml. of 1 N hydrochloric acid was added. The resultant solution was refluxed for 3 hours under nitrogen. The solvents were removed in vacuo (40°C., 1 mm. Hg.). The resultant yellow oil was used directly without further purification.

C. To the crude 2-hydroxy-4-methyl-1-tetralone (1.23 g., 7.0 mmole) prepared above dissolved in 100 ml. of ethanol was added dropwise at room temperature a solution of sodium metaperiodate (2.13 g., 9.1 mmole) in 100 ml. of 1 N sulfuric acid. Stirring was continued at room temperature for 17 hours.

The ethanol was removed in vacuo (50°C.) and the resultant aqueous phase was extracted with four 100 ml. portions of chloroform. The combined solutions were washed with dilute aqueous sodium bicarbonate to pH 8–9. This basic solution was reacidified with dilute hydrochloric acid, and the acid reextracted into chloroform. The combined chloroform solutions were washed with saturated aqueous sodium chloride, dried (anh. $Na_2SO_4$), and concentrated in vacuo to give 2-(o-carboxyphenyl)butylaldehyde as a viscous oil.

D. To a solution of the above acid (773 mg., 4.0 mmole) in ether (25 ml.) at 0°C. under nitrogen was added freshly distilled triethylamine (4 g., 40 mmole). Ethyl chloroformate (0.43 g., 4.0 mmole) dissolved in 10 ml. of ether was then added dropwise at 0°C. Stirring was continued at the cold temperature for 1 hour. The resultant mixture was allowed to warm to room temperature and filtered to remove the precipitated triethylamine hydrochloride. It was then concentrated in vacuo. The n.m.r. indicated it to be the mixed anhydride, with some triethylamine still present. This material was used without further purification.

E. The above crude mixed anhydride (1. g., 4 mmole) was dissolved in 30 ml. of DMF and 20 ml. of pyridine. Choline chloride (1 g., recrystallized from isopropanol, and dried in vacuo) was added and the mixture stirred vigorously overnight (18 hours). The solid unreacted choline chloride was filtered off and the solvent removed in vacuo (50°C. at 1 mm. Hg.). The residue was taken up in a mixture of chloroform and water. The aqueous phase was extracted with three 50 ml. portions of chloroform and used without further purification.

F. To the aqueous solution was added an excess of 2,3-dimethyl-2,3-bis-(hydroxylamino)butane. The aqueous solution was stirred at room temperature for 4 hours. A large excess of lead dioxide was added and the resultant mixture stirred vigorously for 5 minutes. The lead dioxide was removed by filtration through Celite. The aqueous solution was then made acidic to pH 3 by the dropwise addition of 1 N hydrochloric acid, extracted with three 50 ml. portions of chloroform and freeze dried. The residue was dissolved in a minimum amount of chloroform--methanol (3:1). It was filtered to remove insoluble salts and subjected to preparative thin layer chromatography (TLC) (silica, chloroform--methanol (3:1). Extraction of the plates with methanol--acetic acid (100:1) and concentration in vacuo (40°C. at 1 mm. Hg.) of the extracts gave a residue containing some silica gel. This silica gel was removed by the addition of a small amount of acetone followed by filtration. The filtrate on evaporation in vacuo yielded an amorphous powder which did not crystallize but was shown to be pure by TLC.

The product had the following ESR spectrum:
(pH 6.92): $a_N = 8.12$, $a_H = 3.21$, $a_H = 1.18$ gauss.

Alternatively, the carboxylic acid group need not be esterified before the imidazolidine ring is formed.

G. The aldehyde as obtained from the periodic acid oxidation (D.) was dissolved in methanol--water (1:1). Excess 2,3-dimethyl-2,3-bis-(hydroxylamino)butane butane was added and the resultant solution stirred at room temperature for 1 hour.

The mixture was oxidized with aqueous sodium metaperiodate and the aqueous solution adjusted to pH 3 by the dropwise addition of dilute hydrochloric acid. The mixture was extracted with chloroform and the chloroform phase washed with saturated aqueous chloride, dried and concentrated in vacuo. The crude radical product was purified by preparative thin layer chromatography (TLC) (silica, benzene--acetone--glacial acetic acid (100:400:1).

The product had the following ESR spectrum:
(pH 3.49): $a_N = 8.19$, $a_{H_1} = 2.79$, $a_{H_2} = 1.38$ gauss;
(pH 9.86): $a_N = 8.16$, $a_{H_1} = 2.38$, $a_{H_2} = 1.69$ gauss.

EXAMPLE 8

L-leucyl-L-aspartic acid
N,N'-bis(1-oxyl-2,2,6,6-tetramethyl-4-piperidinyl) diamide A. To an ice cold mixture of 4-amino-2,2,6,6-tetramethylpiperidine-1-oxyl (0.46 g.), dicyclohexylcarbodiimide (0.63 g.), acetonitrile (4 ml.), methylene chloride (1 ml.) and ethyl acetate (1 ml.) was added Boc-L-aspartic acid (0.31 g.) and the suspension was magnetically stirred at room temperature for two days. After filtration, the solvent was removed in vacuo and the residue was dissolved in methylene chloride. The solution was washed with water and evaporated to give a semi-solid residue. This was purified by column chromatography on silica gel by using chloroform-methanol 95:5 as eluent. The two major bands were collected in small fractions monitored by thin layer chromatography (TLC) (silica, chloroform-methanol 95:5). From the fast moving band 0.268 g. of chromatographically homogeneous solid was obtained. The product (0.2 g.) was dissolved in dry glyme (dimethoxy ethanol) (2 ml.) and a few ml. of an HCl-saturated ether solution were added dropwise to the cold, and stirred solution. After dilution with dry ether the mixture was stirred for 1 hour and the precipitated salt filtered off and washed with dry ether (weight 0.18 g.). The salt was dissolved in excess ice cold 0.1 N NaOH solution and the mixture was saturated with NaCl and extracted with chloroform. From the dried organic layer dried with anh. $Na_2SO_4$, a thick oily residue (0.14 g.) was isolated. This was purified on a solica gel column by using chloroform-methanol 95:5 mixture to give the free amino-biradical (0.063 g.).

B. To an ice cold solution of the above product (0.063 g.) and dicyclohexylcarbodiimide in methylene chloride (1 ml.) was added Boc-L-leucine (0.043 g.). The mixture was kept in the refrigerator 24 hours, then at room temperature 12 hours. After filtration, the solution was washed with water, dried, and evaporated to give a thick semi-solid residue (0.1 g.). It showed one major spot on TLC (silica, chloroform-methanol 95:5). This product (0.08 g.) was dissolved in dry glyme (1ml.) and an excess of HCL-saturated ether was added dropwise. The mixture was stirred magnetically for 20-25 minutes, then filtered. The yellow solid, the HCl-salt of the free amine, was washed with dry ether and kept in a well closed vial in the refrigerator.

EXAMPLE 9

Amylose labeled with
3-carboxyl-2,2,5,5-tetramethyl-3-pyrrolin-1-oxyl

A. To a solution of 1.0 g. amylose in 25 ml. dry dimethyl sulfoxide and 1 ml. pyridine under nitrogen at 60°C. was added a solution of 0.154 ethyl formyl 3-carboxy-2,2,5,5-tetramethyl-3-pyrrolin-1-oxyl anhydride in 1.0 ml. dimethyl sulfoxide. The reaction was allowed to stir for 4 hours at 60°C. before being added to 300 ml. acetone to induce precipitation of the amylose. The acetone was decanted and the white solid triturated twice more with fresh acetone. After filtering and air drying, the recovered white solid, and low molecular weight fragments were removed by stirring the spin labeled amylose in water at 80°-90°C. for 15-20 minutes. The insoluble spin labeled amylose recovered by filtration, was suitable for the amylase assay. The ESR spectra indicated immobilized spins.

The product had the following ESR spectrum:
($H_2O$): $a_N = 16$ gauss.

EXAMPLE 10

N,N'-Bis(2,2,6,6-tetramethyl-1-oxyl-4-piperidinyl) ethylene diamine

A. 4-Amino-2,2,6,6-tetramethylpiperidinooxyl (0.75 g.) was dissolved in methanol (1 ml.) and aqueous solution (40 wt. percent; 0.33 ml.) was added. The mixture was kept at room temperature overnight. The dark red precipitate was filtered off and washed with minimum amount of ethyl acetate. From the mother liquor on standing for a few days a second crop (0.12 g.) of the product could be isolated.

The analytical sample was obtained by recrystallization from ethyl acetate, m.p. 187°-188°C.

B. To a magnetically stirred suspension of the above product (0.48 g.) was added sodium borohydride (0.1 g.) in three portions. Each addition was accompanied by vigorous gas evolution and the solution warmed up for some extent. To the end of the addition a clear solution has been obtained and stirring was continued for ca. 45 min. The solvent was then removed in vacuo, the residue dissolved in water and the aqueous solution was thoroughly extracted with chloroform. The combined chloroform extracts were dried, filtered and concentrated to give a solid product. (0.48 g.). The analytical sample was prepared by sublimation from hexane.

The compounds which have been prepared are exemplary of the compounds which may be used for enzyme assay, employing the various techniques which have been described earlier. While in the present assays, known enzymes are employed in predetermined activities, the same method would be employed where an unknown solution was being used. The media to be employed for any particular enzyme system are well known in the literature. Normally, salts will be added, e.g. magnesium, manganese, nickel, iron, etc., the solution buffered to the desired pH and any other cofactors included as required.

The carrying out the assay, a small assay of of an unknown solution suspected 7 having one or more enzymes present is taken and 6.92 necessary salts and cofactors added. Incubation at moderate temperatures may be required. A compound having the requisite functionality for the suspected enzyme is added usually to provide a concentration of from about $10^{-7}$ to $10^{-2}$ M and the solution put into cavity ESR capillary. The capillary is then introduced into the ESR cavbity and the spectrum recorded. The spectrum may be continuously monitored, although for a quantitative determination, the time to a certain percent reaction may be determined. By relating this time to known standards, the activity of the enzyme can be calculated. Alternatively, a fixed time from mixing may be used and the percent reaction used to determine the activity of enzyme present.

When the reaction is extremely rapid more exotic systems may be required, such as flow systems, or other means for monitoring rapid reactions.

The following examples indicate various methods of assaying enzymes with alkaline phosphatase.

To a dilute solution of the phosphate free radical of Example I in pH 8.5 buffer was added 3 μl. Boerringer-Mannheim alkaline phosphatase (A=300 I.U./ml.), the solution mixed, transferred to an ESR capillary and introduced into the ESR cavity. Within 2 minutes after the addition, no phosphate radical could be detected by ESR. Both the ESR spectrum and thin layer chromatograph (TLC) of the product confirmed complete conversion to the alcohol.

ESR: (product) (pH 8.5) $a_N = 8.0$, $a_{H_1}=1.4$, $a_{H_2}=3.0$ gauss;

(substrate) $a_N=8.0$, $a_{H_1}=0.7$, $a_{H_2}=3.3$ gauss.

The next assay for alkaline phosphatase employed the compound prepared in Example 2. A stock solution of the compound of Example 2 (approximately $5\times10^{-4}$ M) in 0.5 M 2-aminopropanol buffer (pH 10.3) containing $1\times10^{-3}$ M magnesium chloride was prepared and stored at 4.0°C. protected from light. The same enzyme sample was employed as used above.

The substrate solution was preincubated at 40°C. in a constant temperature bath. To 0.200 ml. of the substrate solution was added 5 μl. alkaline phosphatase. The solution was mixed, transferred to an ESR capillary, and inserted into the ESR cavity prewarmed to 40°C. Only the signal of the left hand pair of lines of the middle multiplet of the complete 5×4-line spectrum was recorded. The ratio of peak intensities was followed. A discussion of the method for following the spectrum may be found on page 42, infra.

Alkaline phosphatase was assayed by use of the compound prepared in Example 3. A sample of the purified compound of Example 3 (approximately 1 mg.) was dissolved in approximately 1 ml. of 2-aminopropanol buffer 0.5 M (pH 9.2) which was $10^{-3}$ in magnesium chloride. The ESR spectrum of the solution was identical to that of the radical in unbuffered aqueous solution at pH 9.

ESR: $a_{H_1}$=2.3, $a_{H_2}$=2.0 gauss.

A preparation of the purified alkaline phosphatase employed earlier (2–3 μl) was added and the solution transferred to an ESR tube. The ESR spectrum changed very rapidly (within 4 minutes) to give the characteristic pattern of the phenol-methoxy carbonyl ester radical.

ESR: (pH 9.5) $a_{H_1}$=2.92, $a_{H_2}$=1.48 gauss.

Thin layer chromatography (ether) indicated the complete conversion of the starting material to phenol-methoxycarbony radical within 7 minutes. The reaction was readily followed by ESR and the rate was found to be proportional to the amount of enzyme added.

The final alkaline phosphatase assay was carried out with the compound prepared in Example 4. To 20 μl. of a solution $1.21 \times 10^{-3}$ M. in the subject compound, $1 \times 10^{-3}$ M in magnesium chloride and 1.5 M in 2-aminopropanol buffer, pH 9.24, was added 20 μl. of human serum containing alkaline phosphatase. The mixture was allowed to stand for 25 minutes at 25°C. During this time the ESR spectrum indicated a partial conversion of the starting phosphate to the product alcohol. The spectral changes were nearly linear with time and the rate was proportional to the enzyme activity.

The following method was employed in assaying for leucine amino peptidase. The compound of Example 5 was employed. A sufficient amount of the compound of Example 5 was dissolved in a solution prepared from 1 ml. of 0.2 M triethanolamine (pH 8.6) 0.5 ml. of 1.25 M magnesium chloride and 1 ml. of water, to give approximately a $5.0 \times 10^{-4}$ M solution. To 0.1 ml. of the substrate solution was added 0.1 ml. of an activated enzyme solution. This solution was prepared by incubating 0.5 ml. of Hyland Laboratories Special Clinical Chemistry Control Serum with 0.1 ml. of 0.025 M manganese chloride, 0.1 ml. of 0.2 M triethanolamine, pH 8.6, and 0.5 ml. water at 40°C. for 2 hours. The reactants were mixed at room temperature and transferred to an ESR tube and inserted into the spectrometer. Only the signal of the left hand pair of lines of the middle multiplet of the 5×4 line spectrum was recorded. The ratio of the difference of this signal maxima, and minima (1–4) (2–3) was measured as a function of time. The slope of the resulting function was directly proportional to the enzyme activity.

With each free radical compound a pair of maxima and minima are chosen in a single family of lines. The ESR spectrum has relatively sharp peaks which permit accurate measurement of the peak to peak amplitude. Those amplitudes will be chosen which will provide a rapidly changing value for the ratio of the peak to peak amplitudes of the pair of lines. Starting from the left hand, the pen goes down to provide a minimum which is referred to as one, then rises to a maximum which is referred to as two, and so on. Therefore, 1–4 intends the peak to peak amplitude of the first minimum and the second maximum.

the following method was employed for enzyme of cholinesterase. The product of Example 7 was dissolved in a phosphate buffer at pH 6.92 ($10^{-5}$ M). Cholinesterase was added and the ESR spectrum studied over a 5 hour period. The rate of the spectral changes was proportional to the amount of the enzyme that was added.

ESR of starting choline ester: (pH 6.92); $a_N$=8.12, $a_{H_1}$=3.21, $a_{H_2}$=1.18 gauss; $a_N$=8.1, $a_{H_1}$=2.4, $a_{H_2}$=1.6 gauss.

The following method illustrates the assay of leucine amino peptidase employing a biradical. A solution of leucine amino peptidase was prepared from 0.1 ml. of a commercial enzyme preparation by dilution with 2.0 ml. of water, 0.1 ml. of 0.025 M manganese chloride and 0.1 ml. of 0.5 M triethylamine buffer (pH 8.5). This mixture was incubated at 40°C. for 3 hours before use.

A solution of the biradical compound of Example 8 was prepared by dissolving 4.6 mg. of the biradical hydrochloride, 2 ml. of 0.5 M triethanolamine buffer (pH 8.5) and 1 ml. of 0.025 M magnesium chloride in 22 ml. of water. To 1 ml. of this solution was added 0.1 ml. of the enzyme solution at 25°C. A rapid change in the ESR spectrum occurred which was 50 percent complete within 5 minutes. A similar experiment carried out without added enzyme showed only about 0.5 percent reaction in the same time.

The following example demonstrates the tumbling technique, assaying for amylase.

A suspension of 50 mg. of the composition prepared in Example 9 was warmed with 0.25 ml. dimethyl sulfoxide to 50–60°C. for 5 minutes. A total of 2.5 ml. neutral buffer was slowly added while warming the solution at 50°–60°C. After cooling to ambient temperature, the clear supernatant was decanted. To 0.1 ml. of the above solution was added 0.050 ml. of serum (Versatol E and Versatol EN were used as control sera as a source for amylase). The reagents were mixed, transferred to a capillary ESR tube and inserted into the spectrometer. The test was run at room temperature. The signal intermediate of the left hand line of the three-line nitroxide signal was monitored ($a_N$=16 gauss) as a function of time. The slope of the line obtained by plotting the signal intensity versus time is directly proportional to the enzyme activity.

Glutamic pyruvic transaminase (GPT) is assayed as follows:

A solution is prepared at 25°C. of 0.20 ml. $1.2 \times 10^{-2}$ M sodium pyruvate and ca. $10^{-3}$ M in the biradical of Example 10 in distilled water; 0.20 ml. of $3.7 \times 10^{-3}$ M L-glutamic acid in water at pH 7; 0.50 ml. of N/15 pH 7.2 phosphate buffer, and 0.10 ml. of serum containing GPT. The solution is transferred to an ESR tube and the spectrum measured as a function of time. By following the change in the ratio of the peak to peak amplitudes peaks one and two and peaks five and six, the enzymatic activity of the serum can be determined.

The subject invention provides a versatile way for analyzing for particular enzymes and assaying for the amount of enzyme. Because of the high sensitivity of the ESR spectroscopy to extremely small amounts of unpaired electrons, and the substantial absence of external noise in the determination, extremely small volumes of the enzyme containing solutions are required. Therefore, only minute amounts of the compounds of the subject invention are required for the determination of the amount of enzyme.

Furthermore, most of the compounds are readily prepared by convenient means to provide products which are stable for long periods of time and may be easily transported without significant loss of activity of the unpaired electrons. In addition, the method in nowise destroys the activity of the enzyme, so that the enzyme solution may be assayed, the enzyme isolated, and re-used as desired. Enzyme solutions can be used directly without clarification, since the ESR spectroscopy technique does not require a clear solution.

The compounds of this invention are uniquely designed to fulfill the function for enzyme assay. They are water soluble at low concentrations, do not react with the enzyme so as to destroy catalytic activity, and are easily designed so as to be adsorbed onto the enzyme surface to undergo the necessary reaction.

What is claimed is:

1. A compound of the formula:

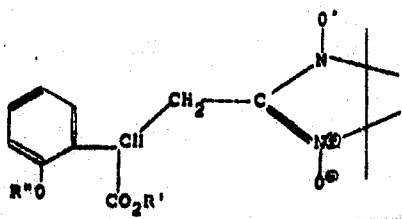

wherein R' is hydrocarbon of from 1 to 12 carbon atoms or $cl(CH_3)_3NCH_2CH_2-$ and R'' is H, phosphate alkali metal salt, or hydrocarbon of from 1 to 12 carbon atoms, and is tetramethylethylenyl.

2. A compound according to claim 1, wherein R' is lower alkyl and R'' is phosphate alkali metal salt.

3. A compound of the formula:

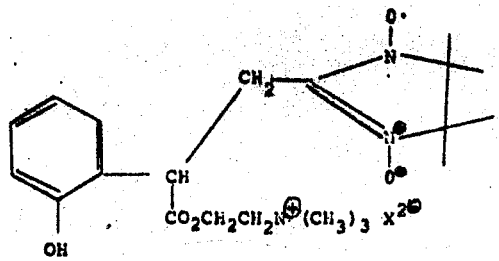

wherein $X^2$ is halogen and is tetramethylethylenyl.

* * * * *